United States Patent Office 2,977,631
Patented Apr. 4, 1961

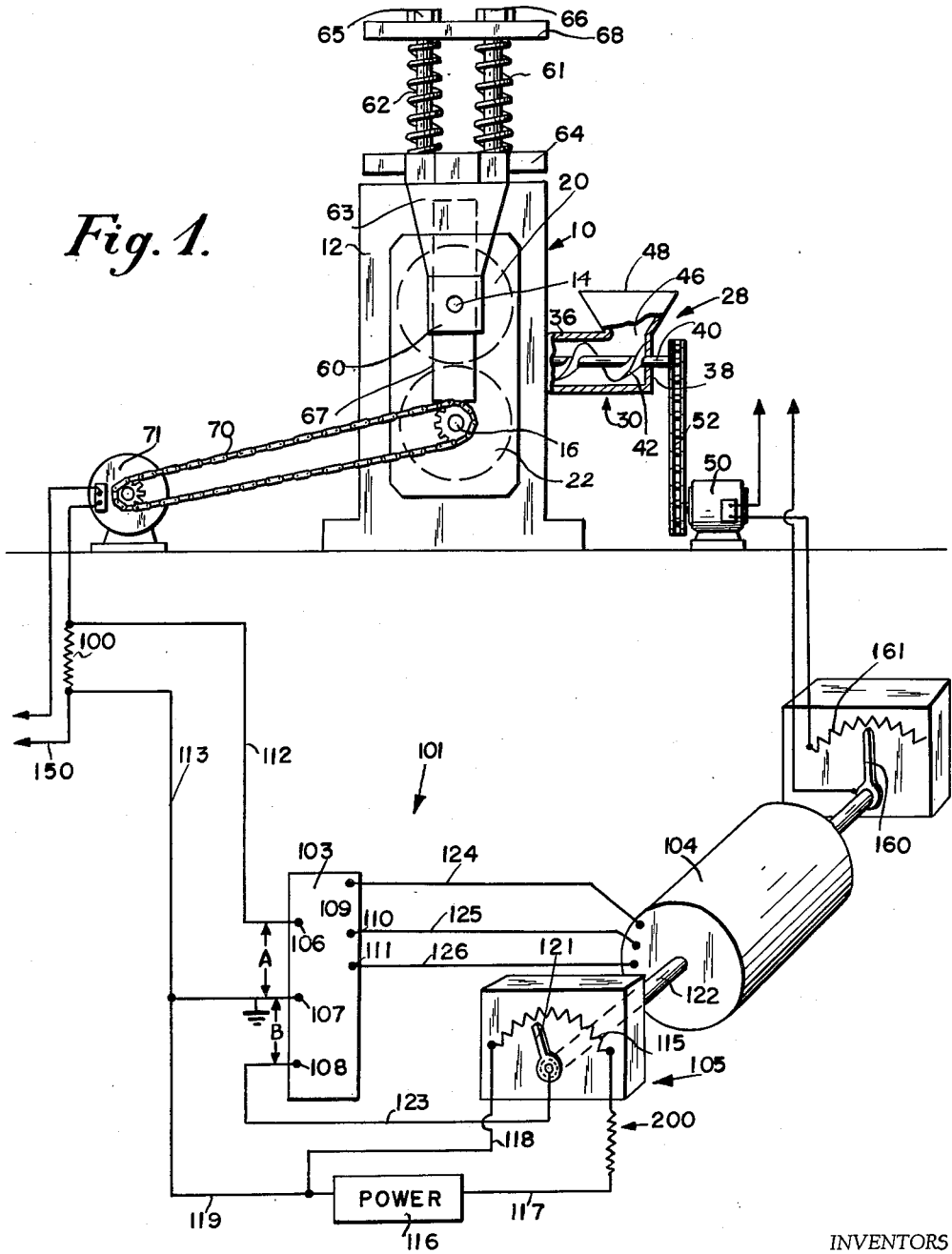

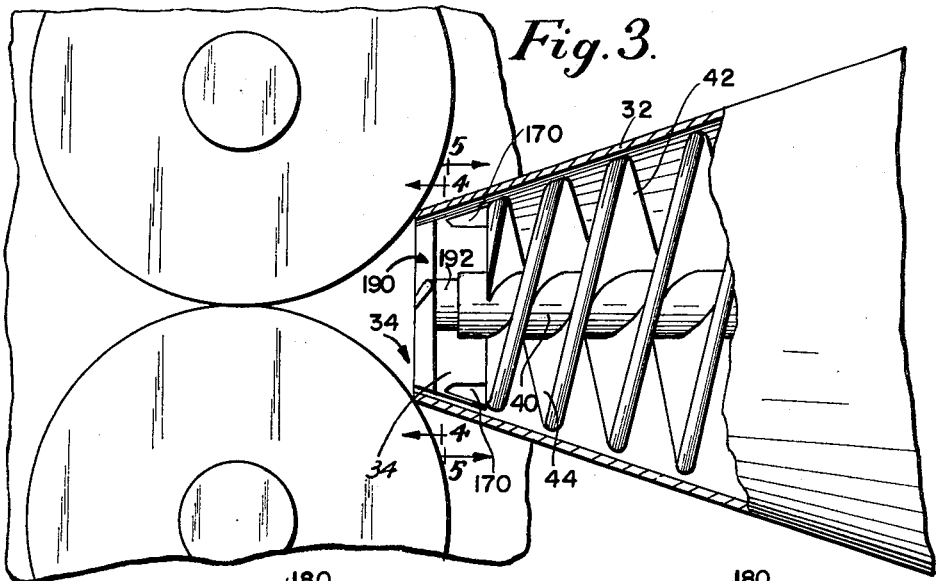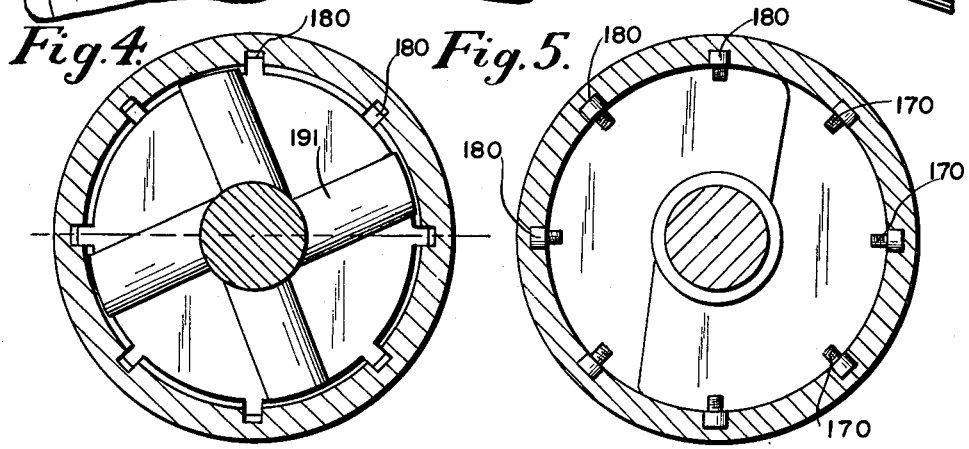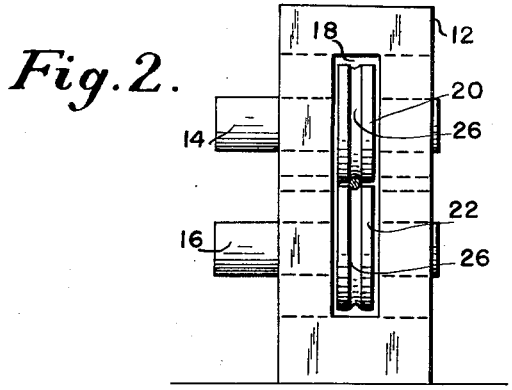

2,977,631
METHOD AND APPARATUS FOR AGGLOMERATING PARTICULATE MATERIAL

Gustav Komarek and Karl R. Komarek, Chicago, Ill., assignors to Komarek-Greaves and Company, Chicago, Ill., a corporation of Illinois Filed Mar. 19, 1958, Ser. No. 722,613

10 Claims. (Cl. 18—12)

This application is a continuation-in-part of our abandoned application Serial Number 557,767, filed January 6, 1956, and entitled "Method and Apparatus for Agglomerating Particulate Material."

This invention relates to agglomeration of solid particulate material and more particularly to an improved method and apparatus for agglomerating particulate material under a high degree of compression control.

In conventional methods of agglomerating particulate material, the feed of such material to the rolls of a press includes simple gravity feed, an improved type of gravity feed coupled with accurate control of rate of flow of the material to the rolls and provision for venting air displaced from the material during agglomeration. Whereas these features are suitable for a large class of particulate materials, the properties of materials in the solid state are so diverse that no single type of feed arrangement has been devised which is entirely suitable for all materials. It is to be noted in this regard, that the bulk properties of particulate solids are dependent not only on the chemical nature of the material, but also on the temperature of the material, particle size, particle shape, moisture content, method of preparation and previous treatment, as well as area of contact of the particles and the amount of air contained in the bulk material. Bulk properties of particulate materials therefore depend on a complex combination of chemical and physical properties and no single property is available to define their flow behavior, such as viscosity, which defines the flow behavior of fluids.

Accordingly, it is a general object of the present invention to provide an improved method for agglomerating particulate material in which the compression of the material is accurately controlled so that uniform agglomeration is achieved.

Another general object of the present invention is the provision of a particulate material agglomerating machine utilizing compression rolls and means for feeding the particulate material to the nip of the rolls, which machine incorporates means for controlling the rate of feed of the particulate material to the nip to effect further compression prior to the application of final pressure between the rolls.

Still further general objects of the present invention are the provision of a novel method and apparatus of the type described which is readily adaptable to suit the varying feed conditions necessary for different particulate materials, and the provision of a novel apparatus of the type described which is simple in construction, easy to operate and economical to manufacture and maintain.

A specific object of this invention is to provide a method for agglomerating particulate material between the nip of cooperating rolls which method incorporates the general steps of (1) feeding the particulate material into a casing, (2) moving the particulate material through the casing while precompressing it and (3) feeding the material between compression rolls. Of course, this aspect of the invention is designed to provide greater uniformity in agglomerate than heretofore obtainable, and therefore it is an object of this invention to provide a method in accordance with the steps outlined above which provides for controlling the rate of feed of the particulate material and for delivering the material to the compression rolls in a manner which insures uniformity.

In order that the method provided by this invention may be fully utilized, other specific objects of this invention are (1) to provide a machine for agglomerating particulate material having a screw feed and compression rolls wherein the feeding of particulate material to the rolls is automatically varied in direct relation to the pressure on the rolls or the power required to drive the rolls so that a uniform agglomerate is obtained; (2) to provide a machine of the above described type having means aside from the screw, to impart a rotary motion to the material being fed between the rolls immediately prior to the compaction of the material by the rolls; (3) to provide a machine of the above-described type incorporating novel means coupled to the free end of the screw for further insuring uniformity of agglomerate and (4) to provide a machine of the above-described type having a feeding chamber with an interior configuration which also further insures uniformity of agglomerate.

Still other objects of this invention will become apparent to those of ordinary skill in the art by reference to the following detailed description of the exemplary embodiments of the invention. The various features of the exemplary embodiments provided in accordance with this invention may be best understood with reference to the accompanying drawings wherein:

Figure 1 is a side elevational view of a particulate material agglomerating machine constructed in accordance with the principles of the present invention and incorporating an exemplary feed control means.

Figure 2 is a basic schematic front view of the machine shown in Figure 1.

Figure 3 is a side view, in schematic form, of the feeder mechanism, per se, as provided by this invention, broken away for the purpose of clear illustration.

Figure 4 is a cross-sectional view taken on the line 4—4 of Figure 3, showing an impeller provided by this invention for imparting rotary motion to the particulate material and also showing the internal configuration of the discharge opening of the improved feeder casing.

Figure 5 is a cross-sectional view taken on the line 5—5 of Figure 3, showing the free end of the improved screw feeder and the internal configuration of the improved feeder casing looking rearwardly thereof.

Referring now more particularly to the drawings, there is shown a machine, generally indicated at 10, for agglomerating particulate material and more specifically for forming a continuous bar of circular or rectangular cross section from particulate material. The machine includes a frame 12 having suitable means thereon for providing a pair of vertically spaced shafts 14 and 16 for rotation about transverse horizontal axes. As best shown in Figure 2, the frame 12 includes a longitudinally extending opening 18 formed in the central portion thereof for receiving a pair of cooperating press rolls 20 and 22 which are suitably secured, as by keys or the like, to shafts 14 and 16, respectively. The outer periphery of each roll includes a semi-circular groove 26 extending entirely therearound.

The rolls 20 and 22 are positioned with respect to each other so that their peripheries are substantially in rolling contact with the grooves of the rolls in transverse alignment so that they cooperate together to form a bar of circular cross section. It will be understood, however, that the particular cross sectional configuration of the bar formed may take many shapes and that the circular configuration is merely exemplary. Moreover, the invention is not limited to the formation of a continuous bar, such as illustrated in the drawings but would have equal applicability in the formation of briquettes or the like. The formation of a solid rod is illustrated because the agglomeration of particulate material into this shape represents a difficult procedure which may be readily accomplished by means of the present invention. In other words, it will be understood that the principles of the present invention may be readily applied to conventional briquetting machines since the formation of briquettes does not represent as formidable a problem as does the formation of a continuous agglomerated bar.

By referring to Figure 1, it will be noted that shaft 14, on which roll 20 is disposed, is mounted in a bearing block 60. The same mounting construction is present on either side of the frame, and therefore only one side will be described in detail. The bearing block 60 is slidably mounted in a longitudinal opening or slot 67 and is spring biased by springs 61 and 62 such that rolls 20 and 22 have peripheries in rolling contact. The spring biasing occurs by virtue of the fact that bearing block 60 is connected, by weld or other suitable means, with plate 63 which in turn is similarly connected with plate 64 which has apertures therein through which bolts 65 and 66 slidably pass. A plate 68, also having suitable apertures therein for receiving bolts 65 and 66, abuts against the heads of bolts 65 and 66. The bolts 65 and 66 are secured to the frame in any suitable manner as by threaded apertures in the frame with which the bolts cooperate. Thus, movement of bearing block 60 upwardly causes movement of plate 63 and plate 64 upwardly whereupon springs 61 and 62 are compressed against plate 68 because bolts 65 and 66 hold plate 68 in a fixed position relative to the frame.

The construction of the press described above is somewhat conventional in that cooperating rolls mounted on a frame constitute the basic components of all rotary agglomerating machines. A feature of the present construction is that the rolls are mounted one above the other with their axes spaced vertically in a transverse vertical plane.

The present invention is, however, more particularly concerned with a novel feed arrangement for accurately controlling the feed and, hence, compression of the particulate material into the nip of the rolls. This feeding arrangement comprises an auger feeding means, generally indicated at 28. The feeding means 28 includes a casing 30 having a frusto-conical discharge end 32, as shown in Figure 3, provided with a discharge opening 34 having an internal diameter at least as great as the diameter of the rod to be formed. Extending rearwardly from the frusto-conical discharge end of the casing is a cylindrical portion 36 having its rearward end closed by a centrally apertured wall 38. Extending through the wall 38 and journalled for rotation therein is a shaft 40 which forms a part of an auger or screw 42. The screw 42 includes a helical blade or flange 44 having a constant pitch and a varying diameter which corresponds with the interior diameter of the casing. Thus, the space defined by the interior of the casing and the exterior of the screw between adjacent corresponding points on the helical blade is greater at the feed or rear end of the auger than at the discharge or forward end thereof. It will also be noted that the axis of rotation of the auger intersects the axis of the bar being formed.

In order to feed particulate material into the casing, the upper surface of the cylindrical portion of the casing is provided with an opening 46 and a funnel-shaped hopper 48 is secured above the casing in a position to direct the particulate material through the opening 46 and into the casing. While a constant pitch-variable diameter screw has been disclosed, it will be understood that a constant diameter-variable pitch screw may be utilized or different combinations of the two. The significant feature of the auger is that the particulate material moving from the feed end of the casing to the discharge end is precompressed into a reduced space by virtue of the physical characteristics of the auger and its cooperation with the casing. This precompression will occur regardless of the speed of rotation of the auger and constitutes the first compression control embodied in the feed of the present invention. It will be understood that the majority of the air in the particulate material is vented during this stage.

The second feature of feed control relates to the rate at which the auger is rotated. For this purpose, there is provided a feed screw drive motor 50 connected with the shaft 40 through a suitable sprocket and chain assembly 52. The motor 50 is merely exemplary and any suitable means may be provided which will afford variable speed rotation for the auger shaft in the manner hereinafter described with particularity. Of particular significance is the fact that the motor is separate from the driving arrangement for the rolls comprising sprocket and chain assembly 70 driven by roll drive motor 71. Of course, a system of variable speed reduction gears or any other system which functions in the prescribed manner could be connected between the roll drive and the shaft 40, the essential condition being that the rotation of the auger can be varied with respect to the rotation of the rolls. In this manner, the material which is precompressed within the casing by the action of the auger will be discharged from the opening 34 into the nip of the rolls at given amounts per unit time. With a given rotation for the rolls, the rate of material discharged through the opening 34 will effect further compression in the nip of the rolls. Final compression wherein the particulate material is formed into a finished agglomerate shape is accomplished by the cooperation by the rolls themselves.

Referring now more particularly to the feed control means, it will be noted that a resistor 100 is connected in series in the power circuit 150 of roll-drive motor 71. Resistor 100 serves as an input signal source to a servo system generally designated by numeral 101. The servo system 101 is conventional in that it comprises a servo amplifier and comparison unit 103, a servo motor 104, and an auxiliary signal generating unit 105. A voltage signal from resistance 100 is fed into servo amplifier 103 at input terminals 106 and 107 via lines 112 and 113. A comparison signal is derived from auxiliary signal generating unit 105 which comprises a potentiometer 115 supplied with voltage from power supply 116 via lines 117 and 118. A rheostat 200 is provided in line 117 for initial adjustment as will become apparent hereinafter. One side of the power supply is coupled to line 113 and amplifier input terminal 107 via line 119. Lines 113 and 119 and input terminal 107 are grounded through a grounding connection 120 so that a common ground connection is provided in the circuit. A contact piece 121 on potentiometer 115 is coupled to shaft 122 of servo motor 104 and thus when the shaft 122 of servo motor is angularly displaced, the signal picked up by the contact piece 121, is varied.

A line 123 carries the signal picked up by contact piece 121 to input terminal 108 of the servo amplifier 103.

Amplifier 103 is a signal comparison and amplifying unit of the common type used in electrical servo systems and well known to those of ordinary skill in the art. When the signal across input terminals 106 and 107 is equal to that across terminals 107 and 108 no output is obtained across lines 124 and 125 or 125 and 126, however, when the signals are not equal an output is obtained. It should be understood that by the term equal is meant balanced. Depending on the type of servo comparison unit and amplifier used, the term may encompass, for example, voltage equalization, phase equalization, signals which are equal and of opposite amplitude or phase to one another, or the like. As is conventional, when the signal across input terminals 106 and 107 (signal A) is not balanced by a signal across input terminals 107 and 108 (signal B) an output occurs across lines 124 and 125 or across lines 125 and 126 depending on the direction of unbalance. It may be assumed that when signal A, for example, is greater than signal B, an output is obtained across lines 124 and 125 which causes servo motor 104 to rotate in a clockwise direction and thereby position contact 121 until signal B equals signal A. According to the same assumption, when signal A is less than signal B, a signal will appear across lines 125 and 126 which causes counter-clockwise rotation of servo motor 104 and contact 121 until signal A is balanced by signal B.

The servo system described above is utilized in the following manner. When the pressure on rolls 20 and 22 increases due to non-uniformity in agglomerate, the current drawn by roll motor 71 increases due to the increased load. As a result of this current increase, the voltage across resistor 100 increases and signal A thereby increases. In accordance with the exemplary operation set forth above, this would cause an output to appear across lines 124 and 125 and a clockwise rotation of contact 121 until signal B balanced signal A.

As shown in Figure 1, servo motor 104 also drives a contact 160 of rheostat 161. This rheostat is in series with screw feed motor 50, and thus as servo motor 104 rotates, the speed of feed screw motor 50 is varied.

Returning to the above exemplary operation of the servo system, it will be noted that when signal A increases and the servo motor rotates clockwise, the amount of resistance in series with feed screw motor 50 also increases and hence motor 50 slows down. Thus, an increased pressure on feed rolls 20 and 22 causes a proportional decrease in the rate of rotation of the screw feeder or more particularly, there is provided means for controlling the speed of screw feeder in proportion to the power drawn by the rolls motor 71. If the pressure on the rolls decreases, the servo system functions in a reverse manner, that is, servo motor 104 is caused to turn clockwise and as a result the resistance in series with motor 50 decreases and the speed thereof increases.

Rheostat 200 is provided for initial balancing of signals A and B when contact 121 is centrally located on potentiometer 115 and the desired pressure is on the rolls. A pressure gauge, not shown, may be included to facilitate the adjustment.

Of course, any number of alternate systems of achieving the above results may be worked out. For example, a pressure transducer or load cell may be used for sensing the pressure on the agglomerating rolls and this signal in turn used to modulate the feeder speed, that is, the speed of motor 50.

As set forth in the objects presented hereinabove, additional means are provided, aside from the screw feed control, to insure uniform agglomeration. These additional means comprise cutter stubs 170 carried on the free end of the feed screw, recesses 180 running longitudinally of the feed chamber, and an impeller 190 having blades 191.

The cutter stubs 170 project from the lowest blade of the screw 42 and serve to scrape the interior walls of casing 32 as well as to impart a grinding to the particulate material they contact. A plurality of cutter stubs may be used or merely a few depending on the material to be agglomerated. The longitudinal recesses 180 extend from the opening of the casing rearwardly thereof and serve to prevent barrelling of the material exiting from the discharge opening 34 of the casing. The recesses may be disposed wholly around the interior of the chamber as shown, or may be disposed partially therearound if desired.

The impeller, which is positioned in the discharge opening 34 of the casing 32 imparts a rotary movement to the particulate material exiting from the casing between the nip of the rolls and prevents unwanted compacting of the material prior to action by the rolls and therefore non-uniformity of the agglomerate. It will be noted that the impeller is spaced from the end of the feed screw such that a "dwell space" is provided within the casing, it having been found advantageous to incorporate such "dwell space" prior to subjecting the particulate material to the action of the impeller as it insures greater uniformity in agglomerate. The impeller is carried on a shaft 192 which may be welded within a suitable longitudinal aperture in shaft 40, or attached thereto by any other suitable means. As shown, the impeller has four angulated blades extending outwardly from a central core, and although this is the preferred construction, it should be understood any number of blades may be used. The angular disposition of the blades with respect to an imaginary plane running perpendicularly of the shaft 192 imparts the desired motion to the particulate material in that it gives the whirling motion to the particulate material which prevents undesired compacting prior to compaction by the rolls.

In the novel apparatus for agglomerating particulate material as above set forth, further control may be achieved by adjusting the amount of taper and/or variations in pitch of the screw. Thus, the spiral can be made to furnish a two to one compression of the material or any ratio of compression that is desired for the material being agglomerated.

The extent of the precompression furthermore is entirely controllable by the characteristics of the auger. Augers are used with precompression ratios ranging from 1.5–1 to 15–1.

The second stage of compression is controlled by the rate of speed of the auger which in turn controls the degree of packing into the nip of the rolls. It is this dual action of precompressing the material to the desired degree by the auger and then independently packing the uniformly precompressed material at a desired rate into the nip of the rolls which makes subsequent forming in the rolls possible and enables the present arrangement to agglomerate certain types of solids which have proven difficult or impossible to agglomerate by previous machines. By this invention, means are provided to maintain feeding pressure and synchronized speed to produce at least 90% of the ultimate density of the materials.

The present arrangement has been used for particles of essentially spherical shape, such as certain metallic powders; for example, nickel and cobalt powders which are not successfully agglomerated by the prior art machines. As another specific example, sodium chloride has been successfully agglomerated by the present machine. This material has a particle shape which is extremely diverse and may be round, square, flat or the like, and, hence, presents particular difficulty. By selecting a proper precompression ratio and rate of feed, sodium chloride has been successfully agglomerated by the present apparatus and method.

Metallurgical agglomeration presents the most diverse particle structure. Nickel powder, for example, presents particles which are all perfectly spherical and can be agglomerated only by exacting control of particle contact, bulk pressure control from the auger feeding action down through the nip and into the rolls. In agglomerating nickel powder a precompression ratio within the auger from between 1½ to 1 and 3½ to 1 is suitable with a 3.0 to 1 ratio being preferred. The rotation of the auger, with respect to the rotation of the rolls, is between limits which will produce from a 1.0 to 1 to a 2.0 to 1 ratio between the volume per second discharge from the casing and volume per second discharge from the rolls with 1¼ to 1 being preferred. The present control feature for feeding to press rolls thus makes possible the by-passing of the melting furnace for melting this powder and permits the stock piling of the agglomerates for direct use as alloys in steel furnaces. Metallurgical agglomeration is also becoming more and more important in the stock piling of strategic materials and where agglomeration is possible, substantial savings can be effected. The present invention makes possible the agglomeration of finely divided solid strategic materials which heretofore could not be agglomerated.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A process for agglomerating particulate material between the nip of cooperating rolls which comprises feeding the particulate material into a casing, moving the particulate material through the casing so that it will be fed between the nip of said rolls, confining the particulate material into progressively decreasing spaces within the casing during the movement therethrough so as to precompress the material, rotating said rolls so that the material fed thereto will be compressed into a shaped, solid agglomerate, and controlling the rate of movement of the material through said casing in direct proportion of the pressure between said rolls so that uniform agglomeration results and so that said compressed material completely occupies the space between the nip of said rolls.

2. A process as defined in claim 1 wherein the particulate material is precompressed within the casing at a ratio from between 1½ to 1 and 3½ to 1, and wherein the precompressed material is further compressed as it is fed between the nip of the rolls at a ratio from between 1 to 1 and 2 to 1.

3. A process for agglomerating particulate material between the nip of cooperating rolls which comprises feeding the particulate material into a chamber, moving the particulate material through the chamber so that it will be fed between the nip of said rolls, confining the particulate material into progressively decreasing spaces within the casing during its initial movement therethrough so as to precompress the material, imparting rotary motion to the precompressed material as it exits from said chamber, rotating said rolls so that the material fed thereto will be compressed into a shaped solid agglomerate, and controlling the rate of movement of the material through said casing in direct proportion to the pressure between said rolls so that said compressed material completely occupies the space between the nip of said rolls and so that uniform agglomeration results.

4. A machine for agglomerating particulate material comprising a frame; a pair of cooperating rolls mounted on said frame, the peripheries of said rolls being disposed in substantially rolling contact with each other and cooperating to form a die means for shaping an agglomerate; a feeder casing said feeder casing having an open discharge end extending inwardly between the nip of said rolls; a screw mounted for rotation within said casing about a horizontal axis, said screw tapering toward said open end of said casing; means to drive said screw comprising a first motor, means to drive at least one of said rolls, comprising a second motor; and means responsive to the pressure between said rolls for controlling the speed of said screw in direct proportion to the pressure between said rolls whereby uniform agglomeration of the particulate material is achieved.

5. A machine for agglomerating particulate material as defined in claim 4 wherein said means for controlling the speed of said screw in proportion to the pressure between said rolls, operates in response to the power drawn by said second motor.

6. A machine for agglomerating particulate material as defined in claim 4 wherein said open discharge end of said casing has an opening width at least as wide as the width of said die means formed by said rolls and wherein said machine further includes an impeller driven by said first motor and mounted for rotation within said casing about said horizontal axis, said impeller being spaced from said screw and disposed substantially at said open discharge end of said casing.

7. A machine for agglomerating particulate material comprising a frame; a pair of cooperating rolls mounted on said frame for rotation about vertically spaced axes, the peripheries of said rolls being disposed in substantial rolling contact with each other and cooperating to form a die means for shaping an agglomerate; a feeder casing, said feeder casing having an open discharge and extending inwardly between the nip of said rolls, said discharge end having an opening width at least as wide as the width of said die means formed by said rolls, said feeder casing also having longitudinal recesses disposed around the interior surface thereof and extending from said open discharge end; a screw mounted for rotation within said casing about a given axis, said screw tapering toward said open discharge end of said casing; an impeller mounted for rotation within said casing about said given axis, said impeller being spaced from said screw and disposed substantially at said open discharge end of said casing; means to drive said screw and said impeller comprising a first motor; means to drive at least one of said rolls comprising a second motor; and means responsive to the pressure between said rolls for controlling the speed of said screw in proportion to the pressure between said rolls whereby uniform agglomeration of the particulate material is achieved.

8. A machine for forming a continuous agglomerated bar from particulate material comprising a frame, a pair of cooperating rolls journaled in said frame for rotation about parallel vertically spaced axes, the peripheries of said rolls being disposed in substantial rolling contact with each other and having groove means formed therein defining a die for shaping the bar, a feeder casing of circular cross-section having an open discharge end extending inwardly between the nip of said rolls and a feed opening at its opposite end, the axis of said casing extending transversely to the axes of said rolls and being disposed midway therebetween, said discharge end having an opening width at least as wide as the width of the groove means formed in said rolls, a screw mounted for rotation within said casing about the axis thereof and extending from said feed opening to said discharge end, said screw having an exterior diameter corresponding with the interior diameter of said casing, the space defined by the interior surface of said casing and the exterior surface of said screw between adjacent corresponding points on the latter being less at said discharge end than said opposite end so that particulate material entering said feed opening will be precompressed before being discharged between the nip of said rolls, and means responsive to the pressure between said rolls for rotating said screw at different speeds variable in respect to the pressure between the rolls so as to control the further compression of the precompressed material discharging between the nip of said rollers.

9. A machine for agglomerating particulate material comprising a frame; a pair of cooperating rolls mounted on said frame for rotation about vertically spaced axes, the peripheries of said rolls being disposed in substantially rolling contact with each other and cooperating to form a die means for shaping an agglomerate; a feeder casing, said feeder casing having an open discharge end extending inwardly between the nip of said rolls, said discharge end having an opening width at least as wide as the width of said die means formed by said rolls, said feeder casing also having longitudinal recesses disposed around the interior surface thereof and extending from said open discharge end; a screw mounted for rotation within said casing about a horizontal axis, said screw tapering toward said open discharge end of said casing; a plurality of cutter blades substantially perpendicularly disposed to said screw on the end of said screw nearest said open end of said chamber; an impeller mounted for rotation within said casing about said horizontal axis, said impeller being spaced from said end of said screw and disposed substantially at said open discharge end of said casing, means to drive said screw and said impeller comprising a first motor; means to drive at least one of said rolls comprising a second motor; and means responsive to the pressure between said rolls for controlling the speed of said screw in proportion to the pressure between said rolls whereby uniform agglomeration of the particulate material is achieved.

10. A machine as defined in claim 9 wherein the particulate material is precompressed within the casing at a ratio from between 1½ to 1 and 3½ to 1, and wherein the precompressed material is further compressed as it is fed between the nip of the rolls at a ratio from between 1 to 1 and 2 to 1.

References Cited in the file of this patent

UNITED STATES PATENTS

| | | |
|---|---|---|
| 1,919,361 | Farrington | July 25, 1933 |
| 2,075,735 | Loomis | Mar. 30, 1937 |
| 2,333,786 | Hessen | Nov. 9, 1943 |
| 2,566,854 | Rhodes | Sept. 4, 1951 |
| 2,663,901 | Hale et al. | Dec. 29, 1953 |
| 2,747,224 | Koch et al. | May 29, 1956 |
| 2,760,229 | Cheney et al. | Aug. 28, 1956 |